July 10, 1951      J. HULSE      2,560,111
BUFFING CHUCK
Filed Nov. 7, 1946      2 Sheets-Sheet 1
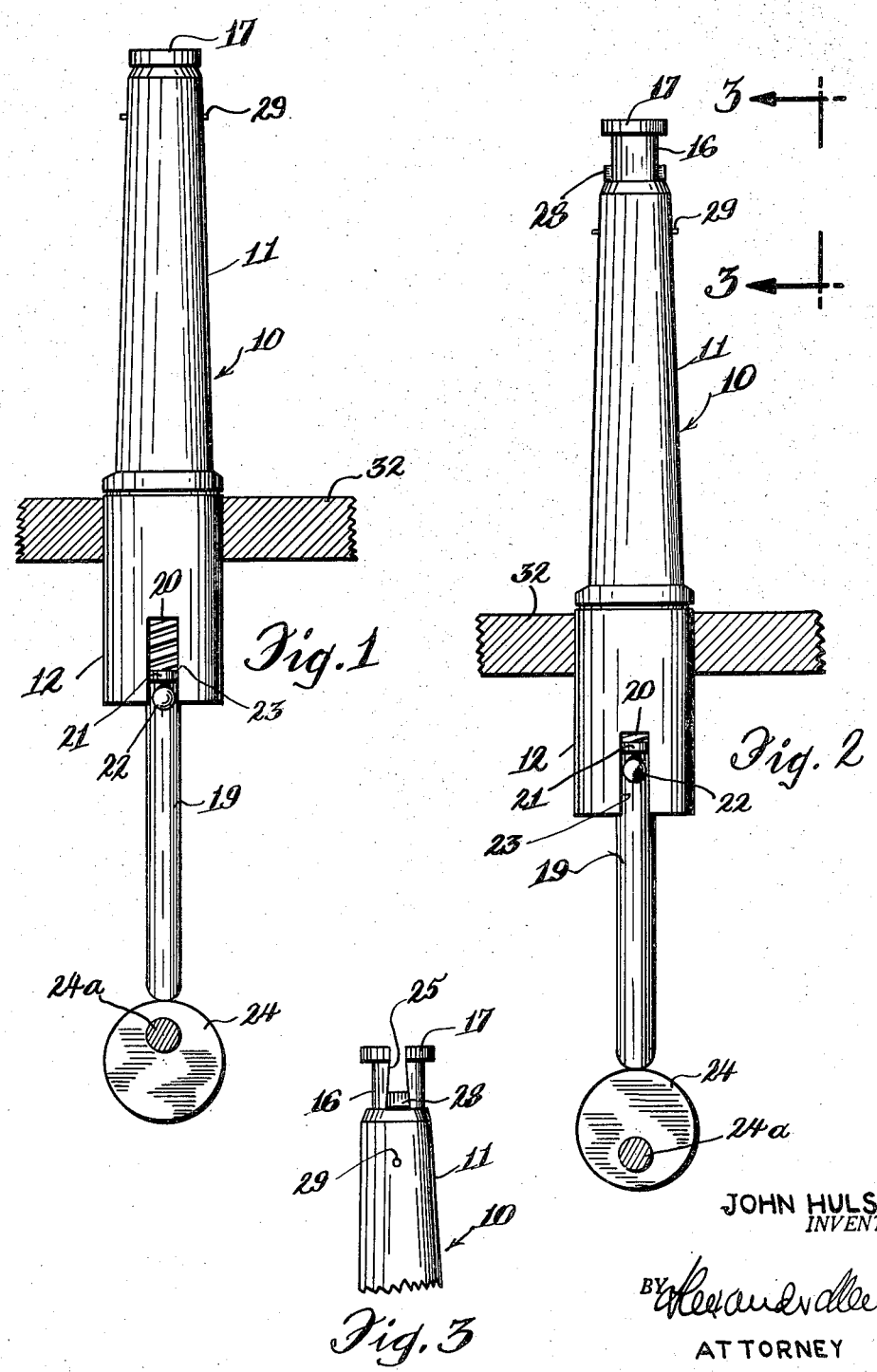
JOHN HULSE
INVENTOR.
ATTORNEY July 10, 1951   J. HULSE   2,560,111
BUFFING CHUCK Filed Nov. 7, 1946   2 Sheets-Sheet 2

JOHN HULSE
INVENTOR.

BY
ATTORNEY

Patented July 10, 1951

2,560,111

UNITED STATES PATENT OFFICE 2,560,111

BUFFING CHUCK

John Hulse, Danbury, Conn., assignor of one-half to Raymond T. Levine, Danbury, Conn.

Application November 7, 1946, Serial No. 708,343

2 Claims. (Cl. 279—2)

This invention relates generally to chucks, but more specifically to a chuck for supporting annular rings, cylinders and other hollow articles for buffing purposes.

A further object of the invention is to provide a chuck of the above nature having a mechanically operated shaft which is maintained in work-holding position by spring pressure, and is forced out of said position by cam means operating against said shaft and spring.

A further object of the invention resides in the provision of a chuck which is adapted for use in connection with the buffing of hollow objects and wherein the chuck is adapted to be mounted on a support below which a movable cam is provided to actuate the shaft associated with the chuck for purposes of locking and unlocking the chuck jaw in connection with the object adapted to be secured thereby.

A further object of the invention resides in the provision of a simple, compact and convenient chuck for the type referred to, characterized by its superior resistance to wear and derangement and to facility of operation.

These objects and other incidental ends and advantages of the invention will hereinafter appear in the progress of the disclosure and as pointed out in the appended claims.

Accompanying this specification are drawings showing a preferred form of the invention wherein corresponding characters designate corresponding parts throughout the several views and wherein:

Figure 1 is a view in perspective partly in section showing the chuck in a locked position by the use of a cam engaging the operating shaft therefor, the chuck being shown as mounted in a support.

Figure 2 is a view similar to Figure 1 showing the chuck in unlocked position by virtue of the change in the cam position.

Figure 3 is a partial end view in elevation of the upper portion of the chuck taken from the plane 3—3 of Figure 2.

Figure 4:
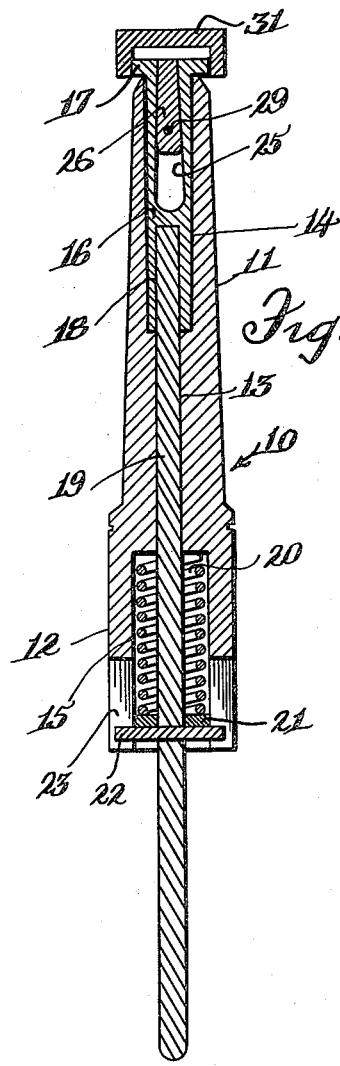
Figure 4 is a sectional view taken axially of the chuck and operating shaft shown in Figure 1 and wherein an object is in locked position with the jaw of the chuck.
Figure 5:
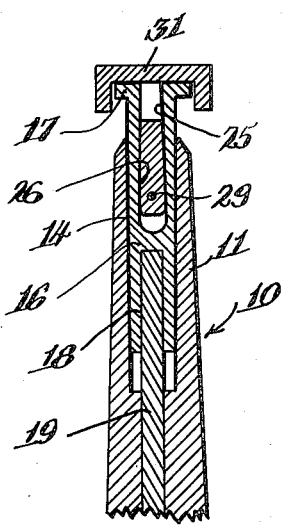
Figure 5 is a sectional view of the upper portion of the chuck showing the jaw thereof in unlocked position relative to the object adapted to be secured thereby.
Figure 6:
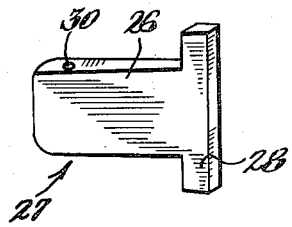
Figure 6 is a view in perspective of a key member adapted to be secured to the body of the chuck.
Figure 7:
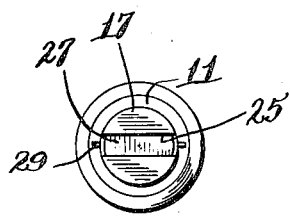
Figure 7 is a top plan view of the upper portion of the chuck shown in Figure 2.

In accordance with the invention and a preferred form shown in the drawing numeral 10 indicates generally a body member of the chuck and has an upper tapered portion 11 to serve as a support for a radially expansive jaw and a lower cylindrical portion 12 adapted to be attached to a support and adapted to house an expansion spring for normally urging the jaw operating shaft to effect a locking position of the jaw with the inner surface of a ring, cylinder or other hollow article requiring polishing or buffing.

Body 10 has an axial bore 13 with an upper expanded bore portion 14 and a lower expanded bore portion 15. Within the bore portion 14 is a cylindrically formed and reciprocable jaw body 16 having a top flanged wall 17 normally engageable with the upper end of body portion 11. Jaw body 16 is provided with a central bore 18 extending from the lower end to engage the upper end of an operating shaft 19 therefor. Operating shaft 19 is normally urged downwardly by a surrounding expansion spring 20 within the expanded bore portion 15 thereby causing the top wall 17 to engage the upper end of body portion 11 which engagement serves as the limit for further downward movement of shaft 19. Spring 20 at the upper end engages the top wall of bore portion 15 and at the lower end engages a washer 21 supported on a shaft cross pin 22.

The cylindrical portion 12 of the chuck body at the lower end has an axial slot 23 to permit reciprocation of the ends of pin 22 as best shown in Figure 4, the lower projecting end of shaft 19 being adapted to engage a reciprocating means therefor such as a cam 24 mounted on a shaft 24a suitably secured below a platform 32. Platform 32 is adapted to mount the chuck in vertical position so that the body requiring buffing may engage the buffing instrument horizontally and from below as will hereinafter appear. It is of course understood that the chuck may be mounted in any other desired position.

The cylindrical jaw body 16 from the top wall 17 to an intermediate position is provided with a wedge-shaped diametric slot 25 the walls of which are adapted to engage the wedge-shaped sides 26 of a preferably T-shaped member 27 having cross extensions 28, the said cross extensions 28 being adapted to engage the upper edge of the tapered chuck body portion 11. Member 27 is secured within body 10 by means of a pin 29 penetrating body 10 and entering a cross bore 30 adjacent the base of member 27.

The top slitted wall 17 is adapted to engage a hollow object 31 for purposes of buffing and as shown in Figures 1 and 4 object 31 is in locked position relative to the expanded perimeter of slitted wall 17. When object 31 is in locked position relative to top wall 17 which serves as a radially expanding jaw, cam 24 is in a position permitting shaft 19 to be in lowermost position as effected by the action of spring 20. When cam 24 is in the position shown in Figure 2 the shaft 19 is forced upwardly against the action of spring 20 thereby bringing the cylindrical jaw body 14 in an uppermost position, the perimeter of the top wall 17 being contracted to permit removal of body 31 by the action of slit 25 with respect to member 27.

The movement of cam 24 is suitably timed to permit the introduction and removal of object 31 on the chuck jaw 17 for buffing purposes and may be synchronized with the rotation of mounting platform 32.

I wish it understood that minor changes and variations in the integration, material, size, location and duplication of parts may all be resorted to without departing from the spirit of the invention and the scope of the appended claims.

I claim:

1. A chuck for engagement of cylindrical objects on the internal diameter thereof including a body, a shaft penetrating through and slidably mounted in said body, a radially expansible gripper member having a diametric wedge-shaped slot slidably mounted in said body and moveable with an secured to the upper end of the shaft, a wedge-shaped member secured to the body and engageable by the gripper member slot to expand and to contract said gripper member whereby on upward movement of the shaft, the gripper member is in unlocked position relative to the object thereon and on downward movement the gripper is in locked position relative to the object thereon.

2. A chuck for engagement of a hollow object on the internal diameter thereof including a body, a shaft slidably mounted in said body, a radially expansible and cylindrical gripper member having a diametric wedge-shaped slot mounted in said body for slidable movement above the upper end thereof and secured to the upper end of the shaft with which it is moveable, an expansible jaw member secured to the top of said gripper member and engageable with the upper end of said body when the gripper is in lowermost position, a wedge-shaped member secured to the body and engageable by the slot of said gripper to expand and contract said gripper, an expansion spring mounted within the body and secured to the shaft to normally maintain the jaw member in engagement with the upper end of the body and in locked position relative to the internal diameter of the object, the said jaw member upon upward movement of said shaft being adapted to project above the upper end of the body and be radially contracted to permit removal of the object held thereby.

JOHN HULSE.

REFERENCES CITED

The following references are of record in the file of this patent:

UNITED STATES PATENTS

| Number | Name | Date |
|---|---|---|
| Re. 9,310 | Birch | July 20, 1880 |
| 599,275 | Webb | Feb. 15, 1898 |
| 2,232,304 | Baker | Feb. 18, 1941 |